United States Patent
Shimizu et al.

(10) Patent No.: US 7,411,557 B2
(45) Date of Patent: Aug. 12, 2008

(54) ANTENNA DEVICE AND RADIO COMMUNICATION TERMINAL

(75) Inventors: Takayuki Shimizu, Higashiyamato (JP); Ryouichi Enoshima, Higashiyamato (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 57 days.

(21) Appl. No.: 11/517,936

(22) Filed: Sep. 8, 2006

(65) Prior Publication Data

US 2007/0052599 A1    Mar. 8, 2007

(30) Foreign Application Priority Data

Sep. 8, 2005   (JP) ............................. 2005-260650
Jul. 19, 2006  (JP) ............................. 2006-196877

(51) Int. Cl.
*H01Q 1/24* (2006.01)
(52) U.S. Cl. ...................... 343/702; 343/833
(58) Field of Classification Search ................ 343/702, 343/833, 834, 860
See application file for complete search history.

(56) References Cited

U.S. PATENT DOCUMENTS

| | | | | |
|---|---|---|---|---|
| 4,123,759 A | * | 10/1978 | Hines et al. .................. | 342/374 |
| 5,243,358 A | * | 9/1993 | Sanford et al. ............... | 343/836 |
| 5,767,807 A | * | 6/1998 | Pritchett ...................... | 342/374 |
| 6,034,638 A | * | 3/2000 | Thiel et al. ................... | 343/702 |
| 6,611,691 B1 | | 8/2003 | Zhou et al. | |
| 6,765,536 B2 | * | 7/2004 | Phillips et al. ............... | 343/702 |
| 6,873,293 B2 | * | 3/2005 | Proctor et al. ................ | 343/702 |
| 6,888,504 B2 | * | 5/2005 | Chiang et al. ................ | 343/702 |
| 7,038,626 B2 | * | 5/2006 | Gothard et al. .............. | 343/702 |
| 2006/0172712 A1 | * | 8/2006 | Sievenpiper et al. ......... | 455/101 |

FOREIGN PATENT DOCUMENTS

| | | |
|---|---|---|
| EP | 1 030 401 A1 | 8/2000 |
| EP | 1 306 922 A2 | 5/2003 |
| JP | 2000-031721 | 1/2000 |
| JP | 2004-072605 | 3/2004 |
| JP | 2004-128660 | 4/2004 |
| WO | WO 99/44307 | 9/1999 |

OTHER PUBLICATIONS

Office Action for Korean Application No. 10 2006-0086364 dated Aug. 7, 2007, with English translation.

* cited by examiner

*Primary Examiner*—Tan Ho
(74) *Attorney, Agent, or Firm*—Cohen Pontani Lieberman & Pavane LLP (57) ABSTRACT

A switching unit which switches the sub antenna, which is for performing diversity reception in cooperation with the main antenna for transmission and reception, from functioning as an antenna to functioning as a parasitic element, or from functioning as a parasitic element to functioning as an antenna, is provided; the main antenna and the sub antenna are provided to be spaced a predetermined distance apart so that multiple resonance can be generated by electromagnetic coupling, and the sub antenna is made to function as a parasitic element to generate multiple resonance, widening the frequency band width within which the main antenna can transmit and receive a radio wave.

14 Claims, 5 Drawing Sheets

ANTENNA DEVICE AND RADIO COMMUNICATION TERMINAL

BACKGROUND OF THE INVENTION

1. Field of the Invention

The present invention relates to an antenna device and a radio communication terminal that receive radio wave signals.

2. Description of the Related Art

In recent years, diversity reception is employed in radio communication terminals including cellular phones. In the diversity reception, a transmitter-receiver antenna element and a receive-only antenna element are connected to a reception device, and signals received by the antenna elements are selected in accordance with the reception electric field intensity, so that, of the signals received by the antenna elements, a signal whose reception electric field intensity is the higher is selected. Or, the signals received by the respective antenna elements are combined.

On the other hand, further downsizing and high-functionalization of radio communication terminals is desired. Thus, it becomes an absolute must, to make the radio communication terminals have antenna elements built-in, while the parts-mounting area becoming smaller.

Accompanied by the downsizing and high-functionalization of radio communication terminals, the downsizing of antenna elements is proceeding.

When the above-mentioned transmitter-receiver antenna element and receive-only antenna element are built in a radio communication terminal, the antenna performance, such as antenna gain and reception sensitivity, tends to be deteriorated due to some circumstances, such as closeness to the peripheral electronic parts and ground (GND) area, and so forth. Further, with the secured areas being insufficient for installing both the antenna elements to be adequately apart from each other, the transmitter-receiver antenna element and the receive-only antenna element are installed to be closer than is necessitated. Such closer installation causes interference between the antenna elements, and the antenna performance thus tends to be deteriorated. Furthermore, there also is a problem that an antenna installed to a radio communication terminal has a narrower receivable frequency bandwidth since such antenna is small.

Accordingly, for example, Unexamined Japanese Patent Application KOKAI Publication No. 2000-31721 discloses a cellular phone in which an electromagnetic shielding is provided between two helical coil elements constituting a diversity antenna and perpendicularly provided on the upper portion of the casing of the cellular phone. In the disclosed structure, this electromagnetic shielding suppresses the mutual interference less and improves the diversity effect. Further, Unexamined Japanese Patent Application KOKAI Publication No. 2000-31721 discloses a method for achieving an electromagnetic coupling in a cellular phone of such structure, in which an additional element, such as a parasitic helical coil element, is provided besides the two helical coil elements, in order to be compatible with bandwidth-widening of frequencies for transmission and reception, or be compatible with multiband, which involves widely separated plural frequencies.

Further, in a portable radio communication terminal disclosed in Unexamined Japanese Patent Application KOKAI Publication No. 2004-72605, a first antenna element is built in a first casing, and a second antenna element is built in a second casing that is foldable over the first casing. Then, when the first casing and the second casing are in the opened position, the first antenna element and the second antenna element serve as a diversity antenna, as constituents thereof. Further, when the first casing and the second casing are in a closed position, the second antenna element serves as a parasitic element such that it operates by electromagnetic coupling with the first antenna element, thereby widening the bandwidth of the first antenna element.

However, the structure disclosed in Unexamined Japanese Patent Application KOKAI Publication No. 2000-31721 provides additional elements such as an electromagnetic shielding and a parasitic helical coil element, besides two helical coil elements that constitute a diversity antenna. For this reason, there is a problem that the structure of the antenna device becomes complex.

Further, the structure disclosed in Unexamined Japanese Patent Application KOKAI Publication No, 2004-72605 include two built-in antenna elements constituting a diversity antenna separately in the foldable two casings. Accordingly, such structure cannot be applied to a radio communication terminal constituted by a single casing, thus not being versatile.

The present invention is made in view of this, and it is an object of the present invention to provide an antenna device which can perform diversity reception and can widen a frequency bandwidth within which the main antenna can transmit and receive a radio wave, and which can be installed on both of a radio communication terminal having one casing and a radio communication terminal having two casings, and to provide a radio communication terminal equipped with the antenna device.

SUMMARY OF THE INVENTION

To achieve the above object, the antenna device of the present invention is an antenna device having a main antenna for transmission and reception and a sub antenna for performing diversity reception in cooperation with the main antenna, wherein a switching unit which switches the sub antenna from functioning as an antenna to functioning as a parasitic element, or from functioning as a parasitic element to functioning as an antenna, is provided, and the main antenna and the sub antenna are arranged so as to be spaced a predetermined distance apart, such that multiple resonance can be achieved by electromagnetic coupling of both the antennas.

The switching unit may switch the connection of the sub antenna, so that the sub antenna is connected to a reception circuit, or so that the sub antenna is connected to ground directly or via a register having a predetermined register value.

A matching circuit adjusted to achieve an appropriate strength of electromagnetic coupling between both the antennas may be connected to each of the main antenna and the sub antenna.

The multiple resonance may have two resonance frequencies, of which a first resonance frequency may be set to be shifted, from the center of a transmission band and a reception band, to the transmission band, and of which a second resonance frequency may be set to be shifted, with respect to the first resonance frequency, to the reception band.

The main antenna and the sub antenna may each be comprised by a dielectric chip antenna, a meander line antenna, a monopole-type pattern antenna formed on a printed board, or any combination thereof.

The main antenna may be constituted of a dielectric chip antenna implemented on a printed board and an auxiliary antenna element which formed by a patterning of a wiring metal layer of the printed board, and which connected to an open end of the dielectric chip antenna.

To achieve the above object, the radio communication terminal of the present invention comprises:

the antenna device, a received signal processing unit which processes a radio wave signal received by the antenna device; and a transmission unit which transmits a radio wave signal from the antenna device.

The received signal processing unit may processes a signal received by the main antenna of the antenna device, when the sub antenna of the antenna device functions as a parasitic element, and may perform diversity processing of a signal received by the main antenna and a signal received by the sub antenna, when the sub antenna functions as an antenna.

The switching unit of the antenna device may switch the connection of the sub antenna in accordance with the kind of a radio wave signal received.

The switching unit of the antenna device may switch the connection of the sub antenna in accordance with the mode of communication.

The present invention is provided with a switching unit which switches the sub antenna from functioning as an antenna to functioning as a parasitic element, or from functioning as a parasitic element to functioning as an antenna, in an antenna device having a main antenna for transmission and reception and a sub antenna for performing diversity reception in cooperation with the main antenna. Further, the main antenna and the sub antenna are arranged so as to be spaced a predetermined distance apart, such that multiple resonance can be generated by electromagnetic coupling.

According to such structure of the present invention, it becomes possible to use an antenna device as a diversity antenna, as well as using it as a transmitter-receiver antenna having wide bandwidth.

Further, according to the present invention, the above antenna device is provided to a radio communication terminal, it becomes possible to perform diversity reception, as well as widening the frequency bandwidth within which the main antenna can transmit and receive a radio wave.

BRIEF DESCRIPTION OF THE DRAWINGS

This object and other objects and advantages of the present invention will become more apparent upon reading of the following detailed description and the accompanying drawings in which.

DETAILED DESCRIPTION OF THE PREFERRED EMBODIMENT

The following describes a preferred embodiment to practice the present invention. However, the scope of the invention is not limited to the embodiment shown in the drawings.

Figure 1:
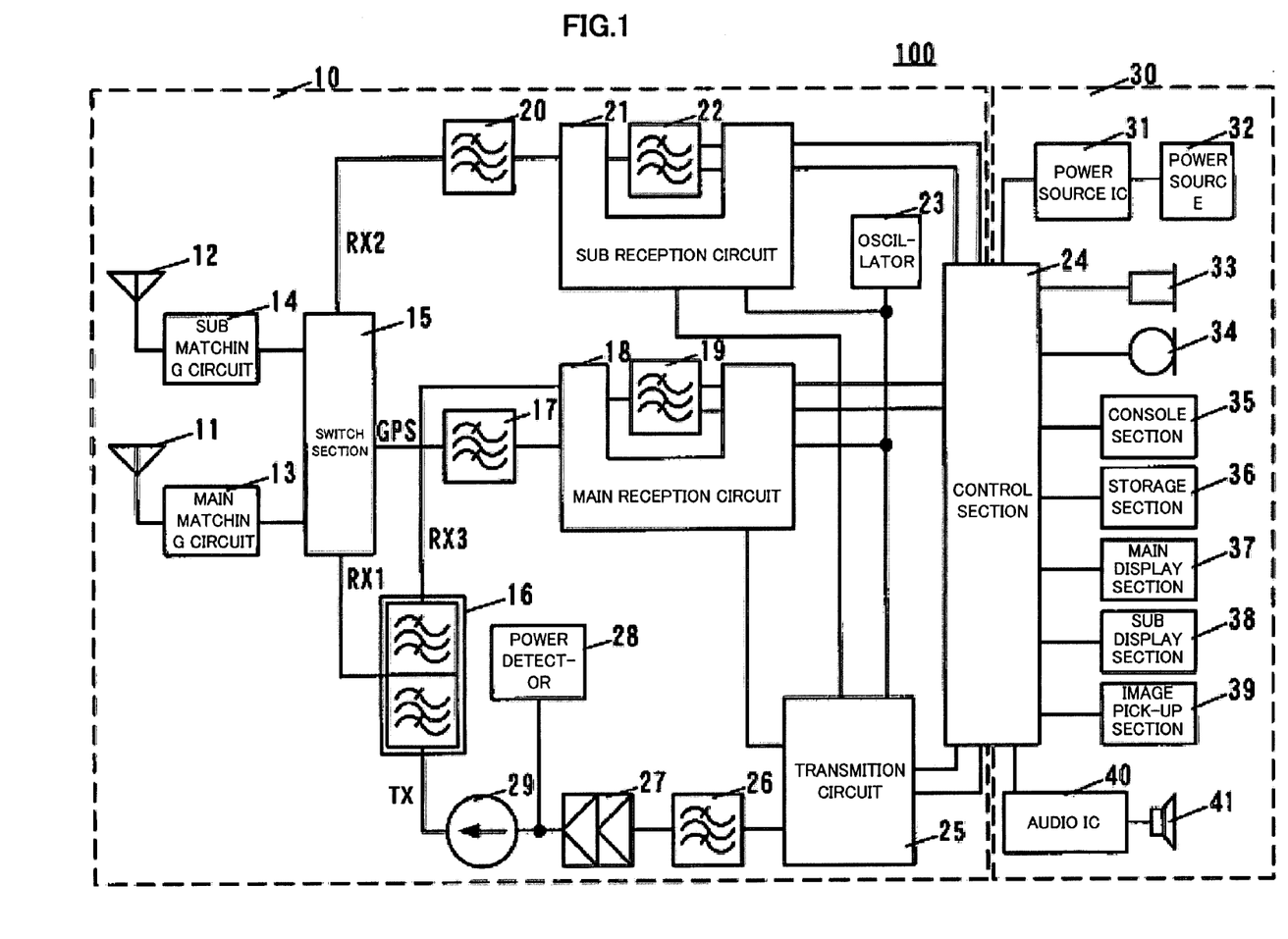
FIG. 1 is a block diagram showing the internal structure of the radio communication terminal.

FIG. 1 shows the internal structure of a portable communication terminal 100 as a radio communication terminal comprising an antenna device according to the present invention. In the present embodiment, a cellular phone terminal is used as a portable communication terminal 100.

As shown in FIG. 1, the portable communication terminal 100 comprises a transmission-reception section 10 and a terminal-function section 30.

Here, the transmission-reception section 10 comprises a main antenna 11, a sub antenna 12, a main matching circuit 13, a sub matching circuit 14, a switch section 15, a duplexer 16, a GPS reception filter 17, a main reception circuit 18, a main reception filter 19, a first sub reception filter 20, a sub reception circuit 21, a second sub reception filter 22, an oscillator 23, a control section 24, a transmission circuit 25, a transmission filter 26, a power amplifier 27, a power detector 28 and an isolator 29, etc.

The main antenna 11 is an antenna for transmission and reception, which is provided within the portable communication terminal 100. The main antenna 11 is capable of receiving and transmitting a radio wave signal conforming to predetermined communication schemes, such as CDMA2000 (Code Division Multiple Access 2000), GSM (Global System for Mobile Communications), and EDGE (Enhanced Data GSM Environment). It is assumed that the main antenna 11 of the present embodiment is compatible with a predetermined communication scheme (CDMA2000) in which the reception band is 832 to 870 MHz and the transmission band is 887 to 925 MHz.

Further, the main antenna 11, on the reception of a GPS (Global Positioning System) radio wave signal, resonates at the frequency required for receiving the GPS radio wave signal (1575.42 MHz). This enables the reception of a GPS radio signal transmitted from a GPS satellite.

The sub antenna 12 is arranged within the portable communication terminal 100. The sub antenna 12 is for performing diversity reception in cooperation with the main antenna 11. The sub antenna 12 can receive a radio wave signal conforming to the same communication scheme as that of the main antenna 11.

The main matching circuit 13 is for matching the impedance of the main antenna 11 seen from the duplexer 16, to a predetermined characteristic impedance.

The sub matching circuit 14 is for matching impedance of the sub antenna 12 seen from the first sub reception filter 20, to a predetermined characteristic impedance.

Referring now to FIGS. 2A to 4C, the aforementioned main antenna 11, the sub antenna 12, main matching circuit 13, and the sub matching circuit 14, are described.

Figure 2A:
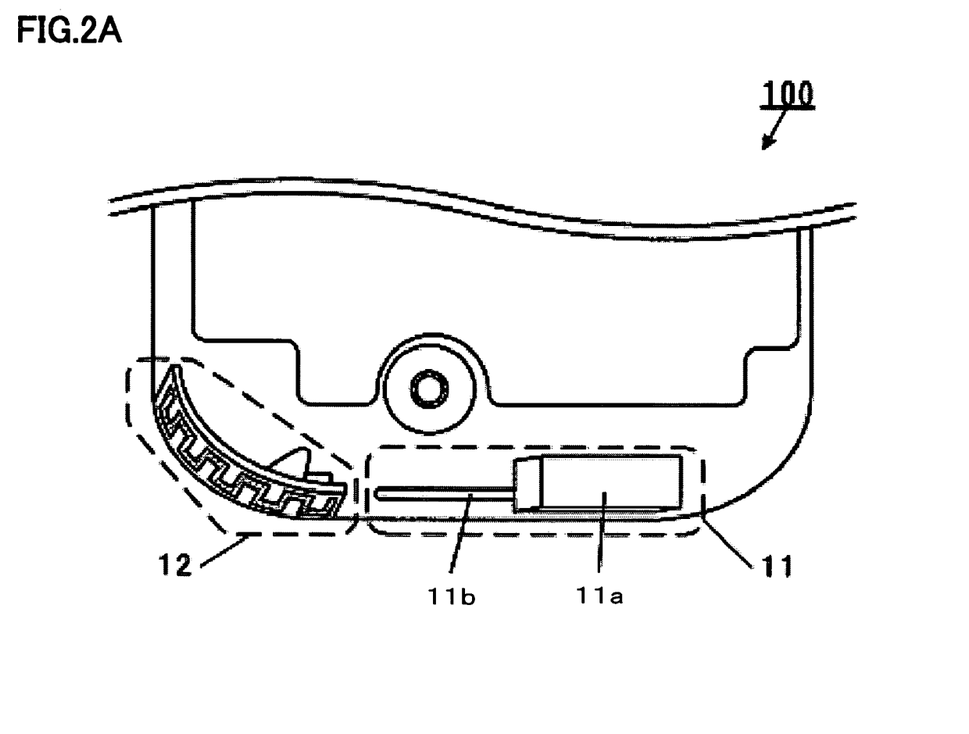
FIGS. 2A and 2B illustrate one example of a main antenna and sub antenna implemented on a substrate of the portable communication terminal.

FIGS. 2A and 2B show an example of the main antenna 11 and the sub antenna 12 mounted on a substrate (printed board) of a portable communication terminal 100. As shown in FIG. 2A, the main antenna 11 comprises a dielectric chip antenna 11a and an added conductor (auxiliary antenna element) 11b. Dielectric chip antenna 11a is provided on the substrate. The added conductor 11b is formed by a patterning of a wiring metal layer on the substrate and is connected to an open end of dielectric chip antenna 11a. Further, the sub antenna 12 is a meander line antenna on which metal-foil of a metal-foil resin film is patterned into a meander form. The sub antenna 11 is formed by attaching a metal-foil resin film on which a meander form is patterned, on a member provided along the end portion of the substrate. Then, the main antenna 11 and the sub antenna 12 are arranged so as to be spaced a predetermined distance apart from each other, to thereby be electromagnetically coupled with each other. More specifically, the main antenna and sub antenna are arranged so that, of respective whole bodies of the antennas, the closest portions are spaced apart a predetermined distance from each other.

Figure 2B:
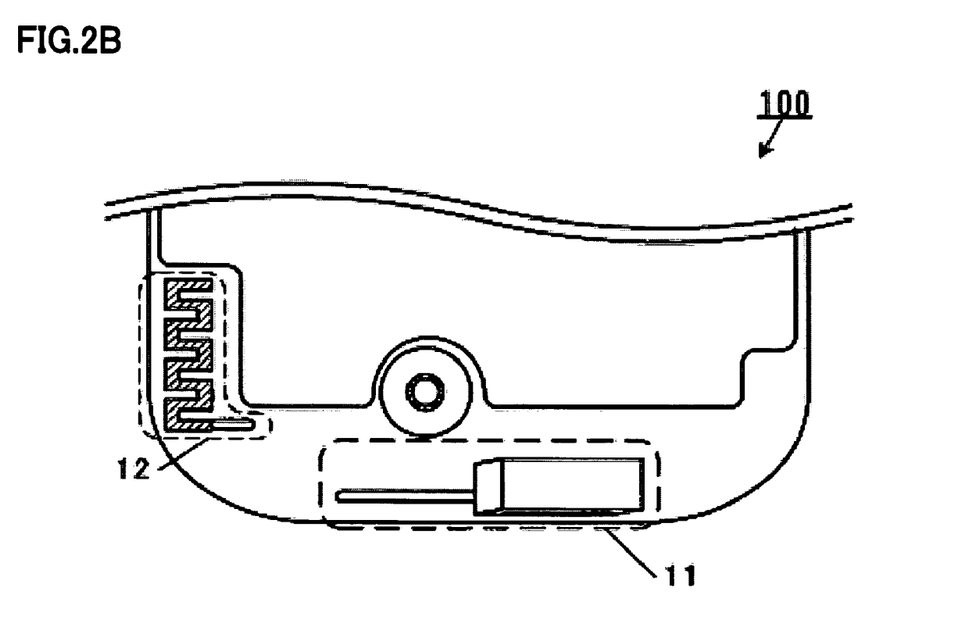

The main antenna 11 and sub antenna 12 are not limited to the above-exemplified embodiments, and can be practiced in different embodiments. For example, as shown in FIG. 2B, the sub antenna 12 may be formed by attaching, onto a substrate, a metal-foil resin film having a meander form patterned thereon. Also is possible to form the sub antenna by directly patterning the meander form on the wiring metal layer on the substrate. Further, the form of sub antenna 12 is not limited to the meander form, and can be another pattern, for example, zigzag pattern, etc. Further, the antenna elements constituting the main antenna 11 and the sub antenna 12 are not limited to the above, and another antenna element of different material or of different form can be employed. In other words, it is possible to employ various types of antenna elements, as the antenna elements for the main antenna 11 and sub antenna 12, for example, a helical coil antenna composed of metal wire, a modified monopole antenna formed of a metal plate, a monopole-type pattern antenna formed of a wiring metal layer on a substrate. Further, the same type antenna element can be employed for constructing both of the main antenna 11 and the sub antenna 12.

That is, it is possible to employ, as the main antenna 11 and the sub antenna 12, an appropriate one of the various types of antenna elements, including a dielectric chip antenna, a meander line antenna, a helical coil antenna, a modified monopole antenna, and a monopole-type pattern antenna formed on a printed circuit board. Further, these antenna elements can be employed in combination.

It is also possible to arrange the main antenna 11 and the sub antenna 12 so as to be in parallel with each other with a predetermined distance, instead of arranging the main antenna 11 and the sub antenna 12 so that, of respective whole bodies of the antennas, the closest portions are spaced apart a predetermined distance from each other, depending on the type of the antenna element used for the main antenna 11 and the sub antenna 12.

Figure 3:
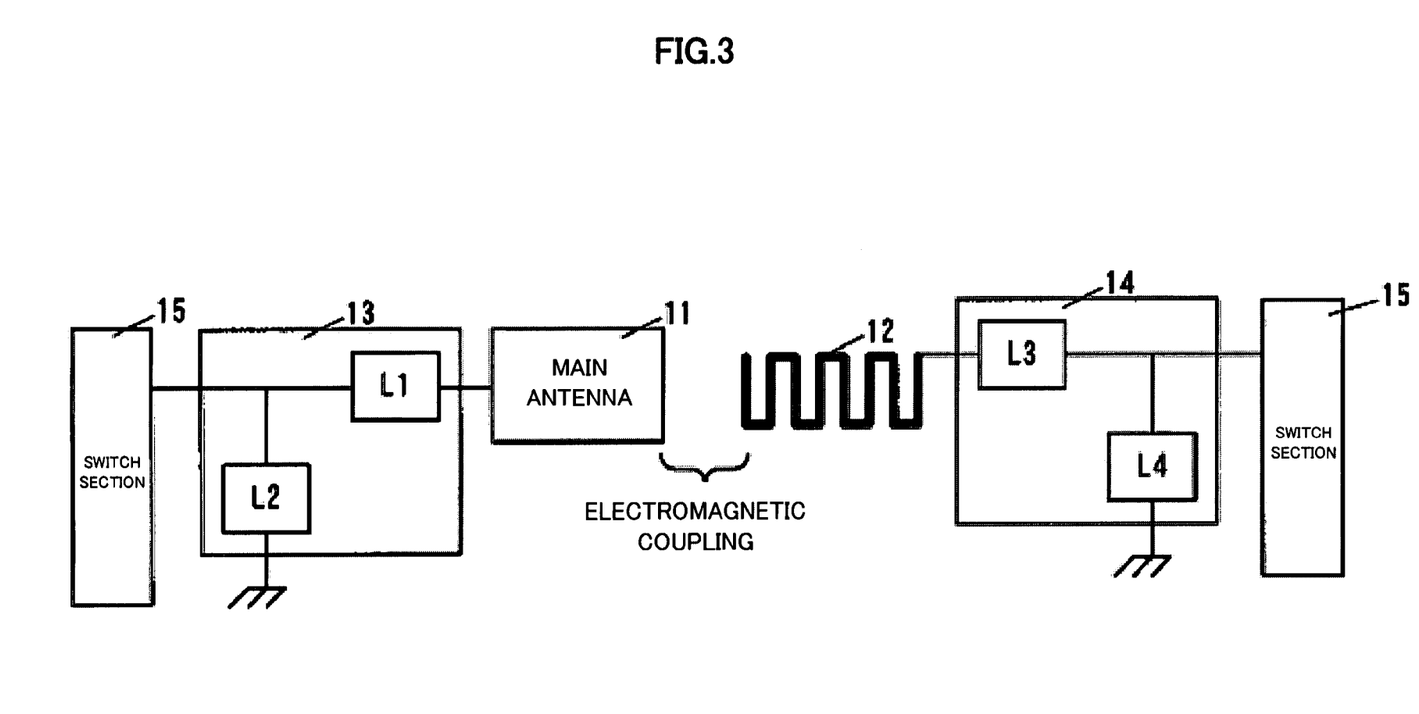
FIG. 3 shows the structures of the main antenna, the sub antenna, a main matching circuit and a sub matching circuit.

FIG. 3 shows the structures of the main antenna 11, the sub antenna 12, the main matching circuit 13, and the sub matching circuit 14.

As shown in FIG. 3, the main matching circuit 13 is positioned between the main antenna 11 and the switch section 15. The main matching circuit 13 comprises a coil having a predetermined inductance L1 connected between the feeding end of the main antenna 11 and the switch section 15, and another coil having a predetermined inductance L2 of which one end is connected between the said coil and the switch section 15 and the other end is grounded. Further, the sub matching circuit 14 is positioned between the sub antenna 12 and the switch section 15. The sub matching circuit 14 comprises a coil having a predetermined inductance L3 connected between the feeding end of the sub antenna 12 and the switch section 15, and a coil having a predetermined inductance L4 of which one end is connected between the coil and the switch section 15 and the other end is grounded.

Figure 4A:
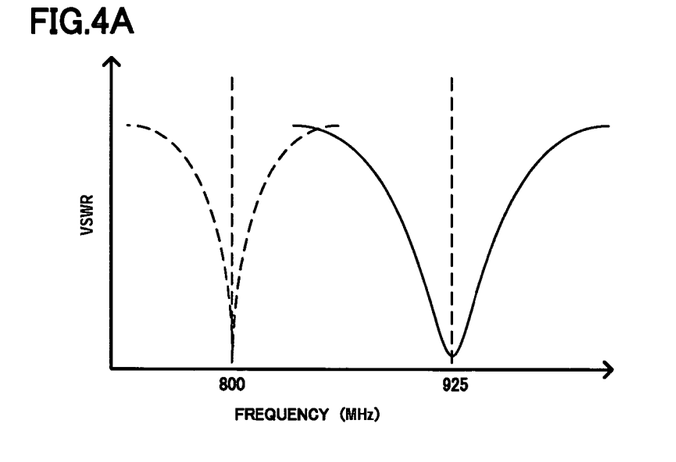
FIGS. 4A to 4C show antenna properties of the main antenna and the sub antenna.
Figure 4B:
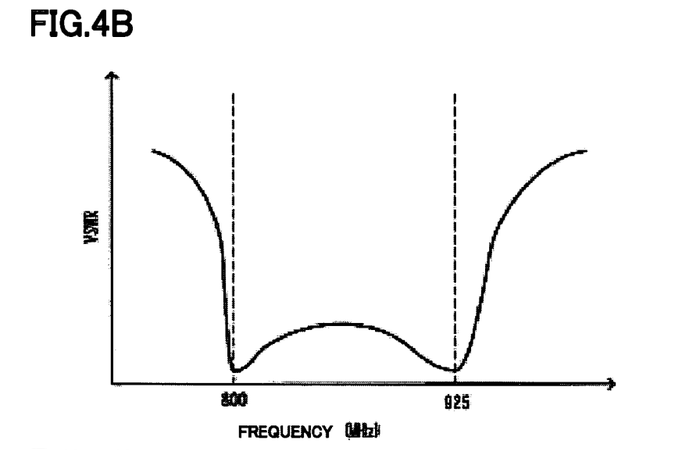
Figure 4C:
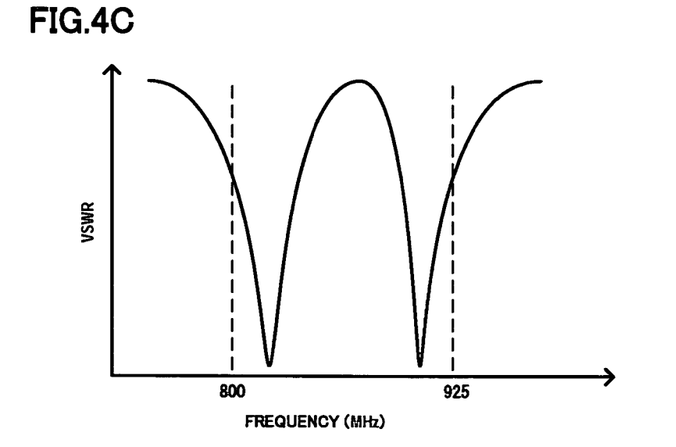

Referring now to FIGS. 4A to 4C, the explanation is given of the antenna property of the main antenna 11 and the sub antenna 12.

FIGS. 4A to 4C show the antenna property of the main antenna 11 and the sub antenna 12. The horizontal axis shows frequency and the longitudinal axis show value of VSWR (Voltage Standing Wave Ratio) of each antenna.

As shown in FIG. 4A, the center frequency of the main antenna 11 is set to be shifted to the upper side (transmission band) (for example, 925 MHz), from the center of the reception band of 832 to 870 MHz and the transmission band of 887 to 925 MHz. The center frequency of the sub antenna 12 is set to be in the neighborhood of the lower limit of the reception band of 832 to 870 MHz (For example, 800 MHz).

In the present embodiment, the center frequency of the main antenna 11 is not set, at the center of the reception band and transmission band, but set to be shifted, from the center, to the transmission band (for example, 925 MHz). This is because a radio wave of a frequency within the reception band of 832 to 870 MHz, is receivable by the diversity reception of the main antenna 11 and the sub antenna 12. Further because such radio wave is receivable by the bandwidth-widening achieved through the later-described setting of the main antenna 11 and the setting is performed so that the transmission property is given priority to.

Further, in the present embodiment, the center frequency of the sub antenna 12 is not set to the frequency within the reception band, but to a value beyond the lower limit of the reception band (for example, 800 MHz). This is because, even in a case where the center frequency of the main antenna 11 is set at the upper limit (925 MHz) of the transmission band and the center frequency of the sub antenna 12 is set at the lower limit (832 MHz) of the reception band, appropriate multiple resonance cannot be obtained since both the antennas are too highly electromagnetically coupled with each other. Accordingly, the center frequencies of main antenna 11 and the sub antenna 12 are set so as to achieve an appropriate multiple resonance by electromagnetic coupling of both the antennas.

The inductances (L1-L4) of the respective coils in the main matching circuit 13 and the sub matching circuit 14 are set so that the value of VSWR becomes low in the frequency bandwidth of 800 to 925 MHz of the main antenna 11, due to the multiple resonance of both the antennas, as shown in FIG. 4B. In other words, impedances of both the antennas are adjusted by the main matching circuit 13 and the sub matching circuit 14 so that the bandwidth of the resonance frequency of the main antenna 11 is widened.

The value of the inductance of each coil which the main matching circuit 13 and sub matching circuit 14 each comprise is adjustable by the following procedure.

(1) First, in the main antenna 11, the inductance of the coil comprised by the main matching circuit 13 is adjusted while the VSWR being measured so that the resonance occurs at a desired frequency (shifted, from the center of the transmission band and the reception band, to transmission band).

More specifically, a coil having an inductance assumed to be preferable for the two coils to constitute the main matching circuits 13 is connected, and VSWR is measured every time of the connection. This procedure is repeated until it is confirmed, by the measurement of VSWR, that the main antenna 11 resonates at a desired frequency. This adjustment process is implemented with the sub antenna 12 being terminated via a predetermined value of resistance (for example, 50Ω), or being opened, or grounded. The present embodiment is structured such that a sub matching circuit 14, which is a matching circuit of the sub antenna 12, is switched to be grounded by the switch section 15. Therefore, it is preferable that the above-described adjustment process is implemented with the sub antenna 12 being grounded.

(2) Next, in the sub antenna 12, the inductance of the coil comprised by the sub matching circuit 14 is adjusted, with VSWR being measured, so that resonance occurs at a desired frequency (shifted, from the center of the transmission band and the reception band, to the reception band). More specifically, a coil having an inductance assumed to be preferable for the two coils to constitute the sub matching circuit 14 is connected, and VSWR is measured every time of the connection. This process is repeated until it is confirmed, by the measurement of VSWR, that the sub antenna 12 resonates at a desired frequency. This adjustment process is repeated with the main antenna 11 being terminated via a predetermined value of resistance (for example, 50Ω), or opened.

(3) Next, the isolation between the main antenna 11 and the sub antenna 12 is confirmed. The isolation between both the antennas is, preferably, at least 8 dB or greater. Isolation less than 8 dB does not produce appropriate multiple resonance, resulting the antenna property shown in FIG. 4C and being incapable of improving the antenna performance.

In the case where the isolation is low, the value of inductance L3 of the sub matching circuit 14 is increased. That is, the coil of the inductance L3 is replaced with one having greater inductance, and the resonance frequency of the sub antenna 12 is shifted to the lower side.

(4) Next, VSWR of the main antenna 11 is re-confirmed to confirm that the bandwidth of the main antenna 11 is widened, to the side of reception band, as compared to the property confirmed by VSWR of (1), by the effect of the resonance of the sub antenna 12. Here, if the bandwidth of the main antenna 11 does not reach the desired value after the widening, the resonance property (the strength of the electromagnetic coupling) of the sub antenna 12 is varied and the adjustment is repeated until the desired value is reached. For example, for strengthening electromagnetic coupling, the value of inductance L3 is reduced to increase the frequency, or the value of the inductance L4 is increased to widen the resonance frequency of the sub antenna 12. Further, the relative distance between both the antenna may be shortened. Conversely, for weakening the electromagnetic coupling, an inverse process of the above may be performed.

(5) Through the repetition of the processes of (3) to (4), the isolation between both the antennas and the state of the electromagnetic coupling are confirmed, and the values of the inductance L3 and the inductance L4 of the sub matching circuit 14 are determined.

(6) After the determination of the inductance of the sub matching circuit 14, VSWR of the main antenna 11 is measured, and if the resonance frequency is low, the value of the inductance L1 is decreased. If the value is high, the value of the inductance L1 is increased. Here, the balance of VSWR (to improve the peak value of VSWR or to improve the bandwidth at the sacrifice of the peak value) is adjusted by increasing or decreasing the inductance L2. Then, the antenna gain and the radiation characteristic of the main antenna 11 is measured to confirm that the desired antenna property is satisfied.

Referring back to FIG. 1, the switch section 15 is a high-frequency switching circuit composed of a GaAs-MMIC (Gallium Arsenide Monolithic microwave IC), etc. The switch section 15 switches the input-output path of the signal, under the control of the control section 24, via the main antenna 11 and the sub antenna 12, in accordance with transmission and reception operations.

Figure 5:
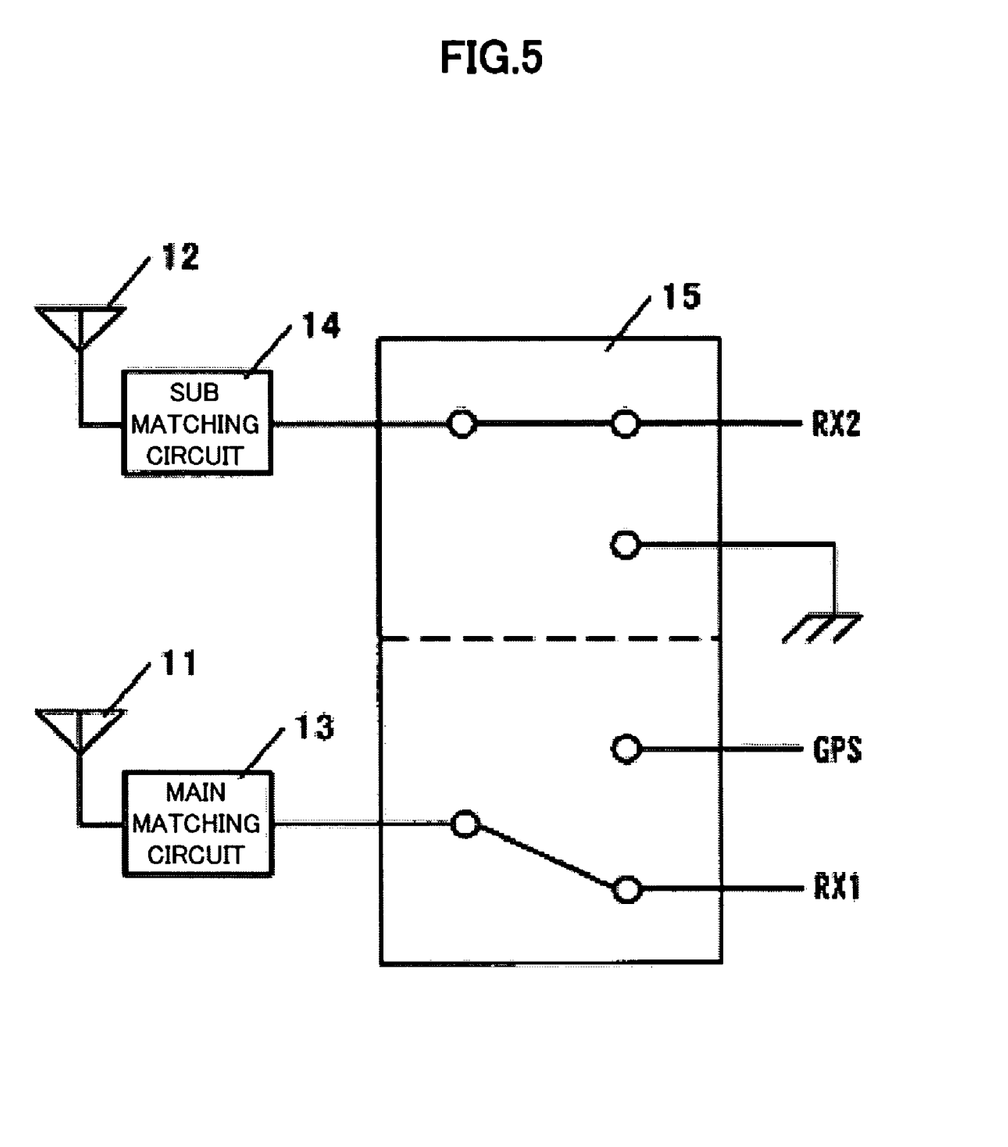
FIG. 5 shows the internal structure of the switch section.

FIG. 5 shows the internal structure of the switch section 15.

The switch section 15, on the reception of a voice call, switches connection so that the main matching circuit 13 is connected to path RX1 connected to the duplexer 16, under the control of the control section 24, and so that the sub matching circuit 14 is connected to ground. Thus, the sub antenna 12 is electromagnetically coupled, as a parasitic element, to the main antenna 11, to widen the reception band of the main antenna 11, as described above.

Further, the switch section 15, at the time of the reception of a radio wave signal on data communication, such as WEB browsing and reception of an e-mail, switches the connection so that the main matching circuit 13 is connected to the path RX1 connected to the duplexer 16, and so that the sub matching circuit 14 is connected to the path RX2 connected to the first sub reception filter 20, under the control of the control section 24. The portable communication terminal 100 thereby shifts into a status in which both of the main antenna 11 and the sub antenna 12 can receive a radio wave signal. In other words, a status in which diversity processing of both the received signals is enabled, is achieved.

In the changes of electric field intensity caused by the movement, etc. of the portable communication terminal, reception level decreases more in a reception system in which only the main antenna 11 wide-banded by the multiple resonance receives a radio wave signal than in a reception system in which received signals received by both antennas are processed by diversity processing. When data reception errors frequently occur in the portable communication terminal 100, a sender (the side of base station) comes to transmit data with decreased transmission rate. This results a reduced speed of data communication. Accordingly, from the viewpoint of a high-speed data communication, the reception system in which diversity processing of received signal is performed by using both the antennas having reception bands shown in FIG. 4A is more advantageous than a reception system in which the main antenna 11 is wide-banded by the multiple resonance.

Accordingly, in data communication such as WEB browsing and receiving of e-mail, in which large data, including image data, is frequently received, a reception system in which diversity processing of received signal is performed by use of both antennas is more advantageous than a reception system in which main antenna 11 is wide-banded by multiple resonance.

Further, the switch section 15, on the reception of GPS radio wave signal, switches the connection so that main matching circuit 13 is connected to a path GPS connected to the GPS reception filter 17 and so that the sub matching circuit 14 is connected to ground, under the control of the control section 24. In this way, the portable communication terminal shifts to a status in which only the reception of a GPS radio wave signal by the main antenna 11 is enabled.

Still further, the switch section 15, on the transmission of a radio wave signal, switches the connection so that the main matching circuit 13 is connected to the path RX1 connected to the duplexer 16, and so that the sub matching circuit 14 is connected to the ground, under the control of the control section 24. In this way, the portable communication terminal shifts to a status in which a radio wave signal can be transmitted by the main antenna 11.

In the above, on the reception of a voice call and a GPS radio wave signal and on the transmission of a radio wave signal, the sub matching circuit 14 is connected to ground. However, the invention is not limited to this. For example, the sub matching circuit may be terminated via a predetermined value of resistance (for example, 50Ω), and may be put into a high-impedance state in which the sub matching circuit is cut off from the internal circuit. When the sub matching circuit 14 is terminated via a predetermined value of resistance (for example, 50Ω), it is preferable that the adjustment of the coil comprised by the main matching circuit 13 is carried out with the sub antenna 12 being terminated via the predetermined value of resistance (for example, 50Ω). Further, when the sub matching circuit 14 is put into a high-impedance state in which the sub matching circuit is cut off from the internal circuit, it is preferable that the adjustment of the inductance of the coil comprised by the main matching circuit 13 is implemented with the sub antenna 12 being opened.

Referring back to FIG. 1, the duplexer 16 comprises a BPF (band-pass filter), etc. comprising a dielectric resonator. The duplexer 16, separates a transmission signal from a received signal each being in a predetermined communication scheme. Specifically, the duplexer 16 outputs a received signal of 832 to 870 MHz received by the main antenna 11 to the main reception circuit 18 via the path RX3. Further, the duplexer 16 outputs a transmission signal of 887 to 925 MHz output via the path TX from the transmission circuit 25 to the main antenna 11 via the path RX.

The GPS reception filter 17 is constituted by a BPF, etc. comprising a dielectric resonator or the like. The GPS reception filter 17 cuts off the signals that are out of the reception band of the GPS radio wave signal received via the main antenna 11. The GPS reception signal of 1575.42 MHz passing the GPS reception filter 17 is output to the main reception circuit 18.

The main reception circuit 18 comprises a low noise amplifier (not shown), a main reception filter 19, and a wave detection circuit (not shown), etc. The main reception circuit 18 performs a predetermined signal processing on the received signal input from the duplexer 16, and thereafter outputs the signal to the control section 24. Here, the main reception filter 19 comprises a BPF, etc. comprising a dielectric resonator or the like. The main reception filter 19 is for cutting off signals that are out of the reception band, for the second time before the wave detection circuit decodes the received signal amplified by the low noise amplifier.

Further, the main reception circuit 18 performs a predetermined signal processing on a GPS reception signal input from the GPS reception filter 17 and thereafter outputs the GPS reception signal to the control section 24. Of the GPS reception signal, signals that are out of the reception band is cut off by the main reception filter 19, similarly to the received signal input from the duplexer 16.

The first sub reception filter 20 comprises a BPF, etc. comprised by a dielectric resonator. The first sub reception filter 20 cuts off signals that are out of the reception band of the received signal received via the sub antenna 12 and outputs a received signal of 832 to 870 MHz that has passed the first sub reception filter 20 to the sub reception circuit 21.

The sub reception circuit 21 comprises a low noise amplifier (not shown), a second sub reception filter 22, and a wave detection circuit (not shown), etc. The sub reception circuit 21 performs a predetermined signal processing on a received signal input from the first sub reception filter 20, and thereafter outputs the processed received signal to the control section 24. Here, the second sub reception filter 22 comprises a BPF, etc. comprised by a dielectric resonator or the like. The second sub reception filter 22 is for cutting off received signals that are out of the reception band for the second time before the wave detection circuit decodes the signal amplified by the low noise amplifier.

The oscillator 23 is constituted by a quarts-crystal oscillator, etc. The oscillator 23 transmits a predetermined frequency (for example, 19.2 MHz) to be the reference of the synchronization signal of each section which the portable communication terminal 100 comprises, to the main reception circuit 18, the sub reception circuit 21 and the transmission circuit 25.

The control section 24 comprises a CPU, a RAM, etc. The control section 24 performs centralized control of each section of the portable communication terminal 100 by cooperating with a predetermined program stored in the storage section 36.

Specifically, the control section 24 determines which of a voice call or a data communication, the received radio wave is, and controls the switch section 15 based on the result of the determination. In the case of a voice call, the control section 24 widens the bandwidth of the main antenna 11 by multiple resonance, and in the case of data communication, the control section 24 performs diversity processing of each received signal, using both the antennas.

In the case of a voice call, the control section 24 decodes the received signal input from the main reception circuit 18. Then, the control section 24 outputs the data signal obtained by decoding to the receiver section 33 or the audio IC 40 of the terminal-function section 30.

In the case of data communication, the control section 24 performs diversity processing of both of the received signal input from the main reception circuit 18 and the sub reception circuit 21. A data signal obtained by decoding the processed received signal is output to audio IC 40, the main display section 37 or the sub display section 38 of the terminal-function section 30. As the diversity system used here, it is possible to employ a system in which a received signal of the larger reception level of both of the received signals is selected (selective diversity system). Or, a system in which both the received signals are in-phase combined (combining diversity system) may be employed.

Further, the control section 24 measures the position of the portable communication terminal 100 of itself based on the GPS reception signal input from the main reception circuit 18. Then, the control section 24 controls the main display section 37 or the sub display section 38 to display image data and character data, etc.

Further, the control section 24, at the time of a call and sending an e-mail by a user, converts, into a predetermined form of compression coding, the voice signal input from a later-described sound collector 34 or a data signal input from the console section 35. Then, the control section 24 outputs the converted data to the transmission circuit 25 as a transmission signal.

The transmission circuit 25 is constituted of a modulator (not shown), etc. Transmission circuit 25 performs a predetermined signal processing on a transmission signal input from the control section 24 and then outputs the transmission signal to the transmission filter 26 to the power amplifier 27.

Transmission filter 26 is comprised by a BPF, etc. constituted by a dielectric resonator. Transmission filter 26 shuts out transmission signals that are out of the transmission band of the transmission signal input from the transmission circuit 25 and outputs the transmission signal of 887 to 925 MHz that has passed the transmission filter 26, to the power amplifier 27.

The power amplifier 27 is comprised by an amplification circuit, etc. The power amplifier 27 amplifies the transmission signal input from the transmission filter 26.

The power detector 28 detects the value of the output the transmission signal in order to control the transmission power on the transmission becomes constant.

The isolator 29 controls the flow of transmission signal so that the transmission signal input from the power amplifier 27 flows to the duplexer 16, and shuts out signals including noise, input from the duplexer 16. Further, the isolator 29 suppresses the impedance change of the output side of the power detector 28.

Next, an explanation is given of the terminal-function section 30 of the portable communication terminal 100.

As shown in FIG. 1, the terminal-function section 30 comprises a power source IC 31, a power source 32, a receiver section 33, a sound collector 34, a console section 35, a storage section 36, a main display section 37, a sub display section 38, an image pick-up section 39, an audio IC 40, and a speaker 41, etc.

The power source IC 31 supplies driving voltage supplied from a power source 32, including an AC adapter and a rechargeable battery, etc. to each section of the portable communication terminal 100 in accordance with an instruction input from the control section 24.

The receiver section 33 is a sound output device including a speaker, etc. provided at a position that corresponds to an ear and portions therearound of a user. The receiver section 33 outputs a voice signal input from the control section 24.

The sound collector 34 is a microphone, etc. that is provided at a position that corresponds to a mouth and portions therearound of a user. The sound collector 34 outputs the collected voice to be transmitted to the control section 24 as a voice signal.

The console section 35 is constituted by character input keys for inputting various types of characters and by various functional keys, etc. The console section 35 outputs a push-down signal of each key pushed-down by a user, to the control section 24.

The storage section 36 comprises a recording medium (not shown) having a program and data, etc. stored therein in advance. The recording medium is constituted by an EEPROM (Electrically Erasable and Programmable Read-Only Memory), a semiconductor memory such as a flash memory, or a magnetic recording medium. This recording medium is fixedly provided to the storage section 36, or detachably installed thereto. Then, the recording medium stores, various processing programs, and data processed by the various processing program. Further, the program is stored in the form of a computer-readable program code. The control section 24 performs data communication via calling to and from an external information terminal or via the Internet, etc., in cooperation with the program.

The main display section 37 is a display device including a LCD (Liquid Crystal Display), an ELD (Electro Luminescence Display) provided on the front side (a side on which the console section 35 is provided) of the portable communication terminal 100. The main display section 37 displays various types of images on the main display section 37, in accordance with a display signal input from the control section 24.

The sub display section 38 is a display device including a LCD or a ECD provided on the back side of the portable communication terminal 100 and displays thereon various types of images in accordance with a display signal input from the control section 24.

The image pick-up section 39 comprises an optical lens of glass or parasitic, etc. and an imager pixel surface on which a plurality of imaging devices such as CCD (Charge Coupled Devices) and CMOS (Complementary Metal Oxide Semiconductor) are two-dimensionally provided. When an instruction to perform imaging is input from the control section 24, the image pick-up section 39 converts an image of an object input via the optical lens and imaged on the imager pixel surface, into an electric signal, generates image data, and outputs the image data to the control section 24.

The audio IC40 comprises an amplifier and LPF (Low Pass Filter), etc. The audio IC40, after performing predetermined signal processing on a voice signal input from the control section 24, controls an external sound output device, such as a speaker 41 built in portable communication terminal 100, or a headphone connected via a sound output terminal that is not shown.

Next, an explanation is given of the operation of when the radio wave signal transmitted from an external equipment is received, in the above-described structure of the portable communication terminal 100.

The control section 24, on detecting a received signal of a voice call, controls the switch section 15 to switch the connection. In other words, the connection of main matching circuit 13 shown in FIG. 5 is switched to the path RX1 extending to the duplexer 16, and sub matching circuit 14 is connected to ground. In this way, the portable communication terminal is switched into a status in which the main antenna 11 of which reception band is widened by the multiple resonance can receive the radio wave signal.

In the above status, a radio wave signal of a voice call transmitted from an external equipment is received by the main antenna 11 having a reception band shown in FIG. 4B. Here, the received signal received by the main antenna 11 is input to the main reception circuit 18 via the path RX1 and path RX3, and output to the control section 24 after having a predetermined signal processing implemented thereon.

The control section 24 demodulates the received signal input from the main reception circuit 18. The voice signal obtained by the demodulation is output to the receiver section 33 or the audio IC40 and so that the radio wave signal transmitted from external equipment is received.

Further, the control section 24, on detecting the reception of the received signal of the data communication, controls the switch section 15 to switch the connection. In other words, the connection of the main matching circuit 13 shown in FIG. 5 is switched to the path RX1 extending to the duplexer 16, and the connection of the sub matching circuit 14 is switched to the path RX2 extending to the first sub reception filter 20. In this way, the portable communication terminal 100 is switched to a status in which the main antenna 11 and the sub antenna 12 can receive a radio wave signal in cooperation.

In this status, a radio wave signal of data communication transmitted from external equipment is received by the main antenna 11 and the sub antenna 12 having a reception band shown in FIG. 4A. Here, the received signal received by the main antenna 11 is input to the main reception circuit 18 via the path RX1 and the path RX3, and output to the control section 24 after having a predetermined signal processing implemented thereon. Further, the received signal is input to the sub reception circuit 21 via the path RX2 by the sub antenna 12, and output to the control section 24 after having a predetermined signal processing implemented thereon.

The control section 24 performs diversity processing of the received signals input from the main reception circuit 18 and from the sub reception circuit 21. Then, data signals obtained by decoding the processed received signal is output to the audio IC40, main display section 37 or the sub display section 38, and so that the radio wave signal transmitted from external equipment is received.

As described above, according to the present embodiment, the sub antenna 12 for performing diversity reception in cooperation with the main antenna 11 for transmission and reception, can serve as a parasitic element. Besides, the main antenna 11 and the sub antenna 12 are provided so as to be spaced a predetermined distance apart, so that multiple resonance can be generated by electromagnetic coupling. In this way, making the sub antenna 12 to serve as a parasitic element and generating multiple resonance enable to widen the transmittable and receivable frequency band width of the main antenna 11. Further, at the time of data communication, making the sub antenna 12 to serve originally as an antenna enables diversity reception of a radio wave signal.

The descriptions of the above-described embodiment show one example of the radio communication terminal of the present invention and the invention is not limited to this. The details of the structure and the details of the operation of the radio communication terminal of the above embodiment can be modified unless departing from the scope of the present invention.

For example, the above-described embodiment, which has illustrated the application of the present invention to a portable communication terminal 100 (cellular phone terminal), does not limit the present invention. It is possible to apply the present invention to an electronic device capable of performing radio communication with external equipment by use of radio wave signal, such as a PDA (Personal Digital Assistants), etc. having a function of radio communication. Further, it is possible to apply the present invention to a radio communication terminal of such type as is connected to other electronic devices in use, such as a radio card, a radio module and a radio modem. Radio communication terminals of this type comprises a substantially same circuitry as the transmission-reception section 10 of the present embodiment, and has a structure in which a diversity-processed received signal is output to an electronic component via a connecter, and a signal from an electronic component is input via the connector.

Further, in the above-described embodiment, the main antenna 11 transmits and receives a radio wave signal, and the sub antenna 12 receives a radio wave signal. However, the structure is not limited to this, and both of the main antenna 11 and the sub antenna 12 may transmit and receive a radio wave signal.

Further, in the above-described embodiment, whether the received radio wave is of a voice call or of data communication is determined and the switch section 15 is controlled in accordance with the result of the determination. However, such an embodiment is possible as in which the communication mode of the portable communication terminal 100 is determined and the switch section 15 is controlled in accordance with the result of the determination. In this case of the determination of the communication mode of the portable communication terminal 100, for example, firstly, it is determined whether the communication mode is a voice call mode or a data communication mode. In the structure, if it is determined that the mode is the data communication mode, it is further determined, which of the data transmission mode or a data reception mode, the mode is. Further, when the communication of the portable communication terminal 100 is the voice call mode or the data transmission mode, the connection is switched so that the main matching circuit 13 is connected to the path RX1 extending to the duplexer 16 and so that the sub matching circuit 14 is connected to ground. Further, when the communication of the portable communication terminal 100 is the data reception mode, the connection may be switched so that the main matching circuit 13 is connected to the path RX1 extending to the duplexer 16 and so that the sub matching circuit 14 is connected to the path RX2 extending to the first sub reception filter 20.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-260650 filed on Sep. 8, 2005 and Japanese Patent Application No. 2006-196877 filed on Jul. 19, 2006 and including specification, claims, drawings and summary. The disclosure of the above Japanese Patent Application is incorporated herein by reference in its entirety.

What is claimed is:

1. An antenna device, comprising:
 a main antenna for transmission and reception; and
 a sub antenna for performing diversity reception in cooperation with the main antenna; and
 a switching unit which switches the sub antenna from functioning as an antenna to functioning as a parasitic element, or from functioning as a parasitic element to functioning as an antenna;
 wherein the main antenna and the sub antenna are spaced a predetermined distance apart, such that multiple resonance can be achieved by electromagnetic coupling of both the antennas; and
 wherein the main antenna comprises:
  a dielectric chip antenna implemented on a printed board comprising an open end and a wiring metal layer; and
  an auxiliary antenna element formed by a patterning of the wiring metal layer of the printed board, and connected to the open end of the dielectric chip antenna.

2. The antenna device according to claim 1, wherein the switching unit switches the connection of the sub antenna, so that the sub antenna is connected to a reception circuit, or so that the sub antenna is directly connected to ground or connected to ground via a resistor having a predetermined resistance value.

3. The antenna device according to claim 1, wherein a matching circuit adjusted to achieve a desired strength of electromagnetic coupling between both the antennas is connected to each of the main antenna and the sub antenna.

4. The antenna device according to claim 1, wherein the multiple resonance has two resonance frequencies,
 a first resonance frequency of the two resonance frequencies being set to be shifted, from the center of a transmission band and a reception band, to the transmission band, and
 a second resonance frequency of the two resonance frequencies being set to be shifted, with respect to the first resonance frequency, to the reception band.

5. The antenna device according to claim 1, wherein the main antenna and the sub antenna each comprise a dielectric chip antenna, a meander line antenna, a monopole-type pattern antenna formed on a printed board, or any combination thereof.

6. The antenna device according to claim 1, wherein the switching unit switches the connection of the sub antenna in accordance with the kind of a radio wave signal received.

7. The antenna device according to claim 1, wherein the switching unit switches the connection of the sub antenna in accordance with the mode of communication.

8. A radio communication terminal, comprising:
 an antenna device comprising:
  a main antenna for transmission and reception;
  a sub antenna for performing diversity reception in cooperation with the main antenna;
  a switching unit which switches the sub antenna from functioning as an antenna to functioning as a parasitic element, or from functioning as a parasitic element to functioning as an antenna;
  wherein the main antenna and the sub antenna are spaced a predetermined distance apart, such that multiple resonance can be achieved by electromagnetic coupling of both the antennas;
 a received signal processing unit which processes a radio wave signal received by the antenna device; and
 a transmission unit which transmits a radio wave signal from the antenna device;

wherein the received signal processing unit processes a signal received by the main antenna of the antenna device when the sub antenna of the antenna device functions as a parasitic element, and performs diversity processing of a signal received by the main antenna and a signal received by the sub antenna when the sub antenna functions as an antenna.

9. The radio communication terminal according to claim 8, wherein the switching unit of the antenna device switches the connection of the sub antenna in accordance with the kind of a radio wave signal received.

10. The radio communication terminal according to claim 8, wherein the switching unit of the antenna device switches the connection of the sub antenna in accordance with the mode of communication.

11. The radio communication terminal according to claim 8, wherein the switching unit of the antenna device switches the connection of the sub antenna so that the sub antenna is connected to a reception circuit, or so that the sub antenna is directly connected to ground or connected to ground via a resistor having a predetermined resistance value.

12. The radio communication terminal according to claim 8, wherein a matching circuit adjusted to achieve a desired strength of electromagnetic coupling between both the antennas is connected to each of the main antenna and the sub antenna of the antenna device.

13. The radio communication terminal according to claim 8, wherein the multiple resonance has two resonance frequencies, a first resonance frequency of the two resonance frequencies being set to be shifted from the center of a transmission band and a reception band to the transmission band, and a second resonance frequency of the two resonance frequencies being set to be shifted, with respect to the first resonance frequency, to the reception band.

14. The radio communication terminal according to claim 8, wherein the main antenna and the sub antenna of the antenna device each comprise a dielectric chip antenna, a meander line antenna, a monopole-type pattern antenna formed on a printed board, or any combination thereof.

* * * * *